US005551770A

United States Patent [19]
Hrovat et al.

[11] Patent Number: 5,551,770
[45] Date of Patent: Sep. 3, 1996

[54] METHOD FOR ESTIMATING PRESSURE IN A PRESSURE ACTUATED CONTROLLER

[75] Inventors: Davorin D. Hrovat; Minh N. Tran, both of Dearborn, Mich.

[73] Assignee: Ford Motor Company, Dearborn, Mich.

[21] Appl. No.: 329,928

[22] Filed: Oct. 27, 1994

[51] Int. Cl.⁶ ........................................................ B60T 8/42
[52] U.S. Cl. ........................................ 303/167; 303/DIG. 4
[58] Field of Search .................................... 303/155, 160, 303/166, 167, 113.4, DIG. 1–4; 364/426.02

[56] References Cited

U.S. PATENT DOCUMENTS

| | | |
|---|---|---|
| 4,749,239 | 6/1988 | Onogi et al. . |
| 4,800,498 | 1/1989 | Matsui et al. . |
| 4,828,334 | 5/1989 | Salman . |
| 4,912,641 | 3/1990 | Kuwana et al. . |
| 4,975,852 | 12/1990 | Fennel et al. . |
| 5,150,298 | 9/1992 | Fujioka et al. . |
| 5,348,380 | 9/1994 | Korasiak et al. ........................ 303/167 |

Primary Examiner—Josie Ballato
Attorney, Agent, or Firm—Gregory P. Brown; Roger L. May

[57] ABSTRACT

A method for estimating hydraulic pressure in a control system that includes hydraulic pressure actuators (28,30) remotely situated with respect to a pressure source (14) wherein pressure at the remote location can be estimated thereby eliminating the need for using pressure transducers to obtain a pressure signal for use in an electronic controller (86,90,142) based on a calibratable relationship between estimated brake pressure and the difference in the volume of fluid flowing toward the pressure actuator and from the pressure actuator. An effective duty cycle for a solenoid operated fluid flow control valve (60,62) in the actuator circuit is determined in accordance with an empirical relationship between the difference between (i) the estimated brake pressure and the supply pressure and (ii) a commanded duty cycle.

6 Claims, 6 Drawing Sheets

METHOD FOR ESTIMATING PRESSURE IN A PRESSURE ACTUATED CONTROLLER

TECHNICAL FIELD

Our invention relates to electronic controllers for fluid pressure systems, particularly electro-hydraulic control systems for automotive vehicles.

BACKGROUND OF THE INVENTION

The improvements of our invention are adapted to be used in electro-hydraulic control systems for estimating pressure in a hydraulic pressure actuator. Our pressure estimation method is adaptable, for example, for use in obtaining a brake pressure signal at the wheel brake actuators of an automotive wheel brake system having anti-lock braking capabilities. It also is adaptable for use in the wheel brake system for effecting anti-wheel spin control and interactive vehicle dynamics control.

In the case of a brake system having antiwheel spin capabilities, a loss of traction can be avoided when the road surface friction changes wheel traction. Vehicle handling capabilities can be ensured as the electronically controlled brakes quickly contain wheel spin independent of driver intervention.

In the case of anti-lock brake systems, the source of pressure is the brake master cylinder. In this implementation, there are two on/off solenoids for controlling each wheel brake pressure actuator, one controlling the brake pressure fill and the other controlling the brake pressure dump. Brake pressure is increased by the normally-open fill solenoids and brake pressure is decreased by the normally-closed exhaust solenoids, which vent the brake pressure to the reservoir.

An important feature of control systems of this kind is the ability to use brake pressure as input information for an electronic controller. The wheel brake pressure must be known in order to achieve the desired control of the interactive vehicle dynamics such as brake-controlled steering. The most direct way to obtain this information is by using pressure transducers. In practice, however, it is not feasible to use pressure transducers in the harsh environment of a vehicle wheel brake. Although a durable and reliable pressure transducer could be used in such environments, the variable cost of manufacturing a brake system with such a pressure transducer would be significantly increased.

BRIEF DESCRIPTION OF THE INVENTION

We have provided an improved control system that makes it possible to obtain an effective and practical pressure estimation of the wheel brake pressures based on simple brake system models. The elements of the system are a pressure generator (either a pressure accumulator or a brake master cylinder), a valve circuit, including brake fill and brake dump valves which inherently have a valve resistance. Such systems are characterized also by an overall brake structural and fluid dynamic compliance factor.

In our improved system, the compliance and valve resistance can be accommodated by the relationship between volume of fluid passing into and out of the brake actuators and an effective pressure. This relationship depends upon empirical data obtained experimentally. In carrying out our improved method, the line pressure is measured and the estimated brake pressure is obtained during each background control loop of the microprocessor. The estimated brake pressure is compared with a reference line pressure or vent pressure, and the difference is used to obtain an effective duty cycle for the dump and fill valves for each wheel brake actuator. This is done by addressing memory locations of the microprocessor in which is stored empirical data indicating a relationship between this differential pressure and the commanded duty cycle.

Having obtained the effective duty cycle, the processor will use that value, together with the difference between the line pressure and the estimated brake pressure, to obtain a differential flow value which, when integrated, results in a measure of the difference in the volume of fluid entering and leaving the actuator through the fill and dump valves. That difference in volume then is used to address a different register location in the microprocessor memory to obtain an estimated brake pressure using empirical data that indicates the relationship between estimated brake pressure and difference in volume.

This control strategy is used for controlling commanded duty cycles for both the fill and dump valves for each of the wheel brake actuators, which have pulse width modulated solenoids. Separate commands are created for the fill valve and for the vent valve. This results in substantially reduced fluid flow requirements on the brake pressure supply pump or the accumulator, whichever is the case. It is also a more straightforward control scheme. The effective duty cycle that is used in this strategy is a function of both the commanded duty cycle and the pressure differential across the valves.

Our improved system, in effect, is an open loop system and, as in the case of most open loop control systems, it is potentially susceptible to unpredicted variations. Such variations, however, are inconsequential for the present pressure estimation method.

PARTICULAR DESCRIPTION OF THE INVENTION

Figure 1:
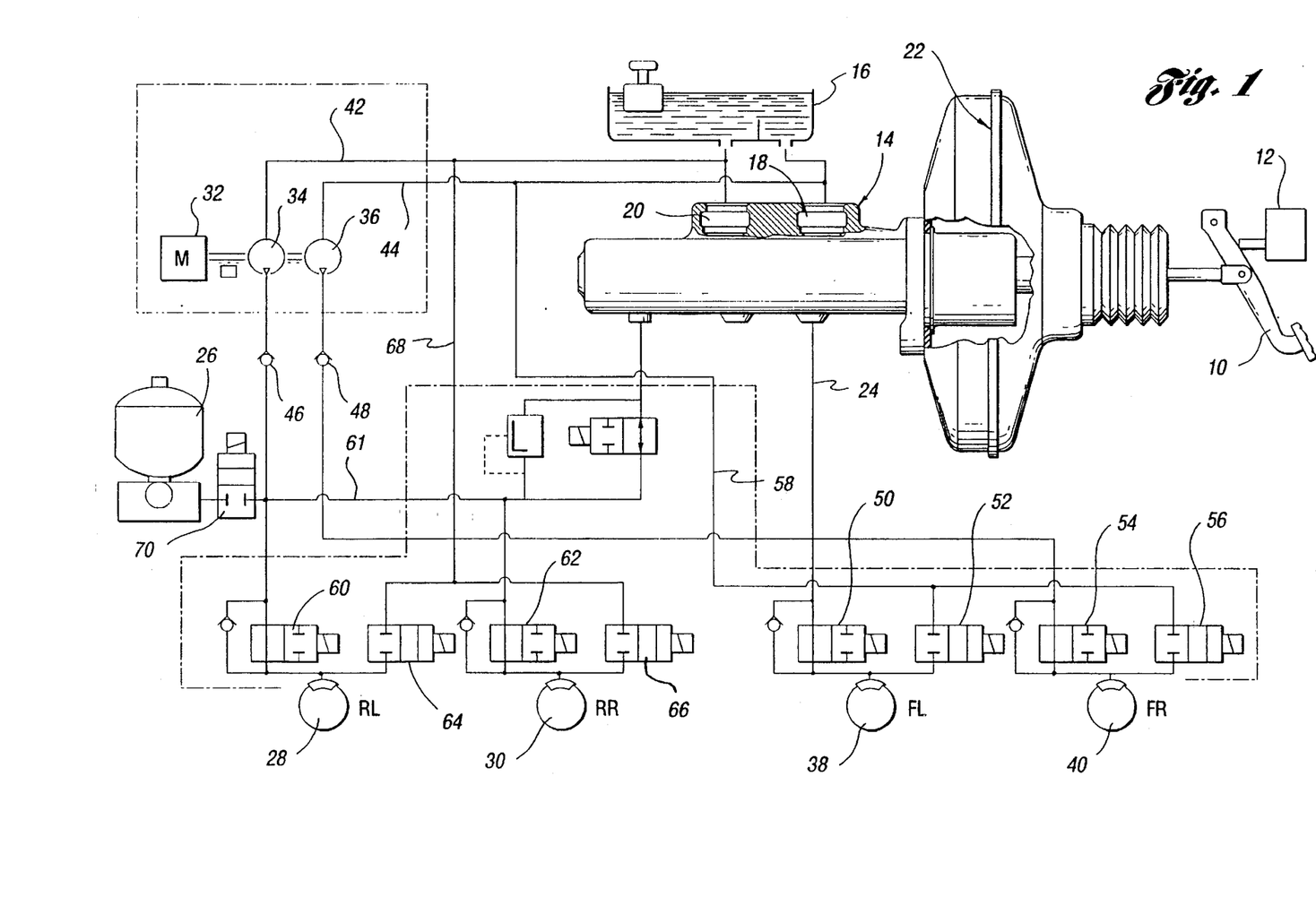
FIG. 1 is a schematic view of a wheel brake system for an automotive vehicle having traction control and anti-lock brake functions.

Although our invention may be adapted for any of a variety of pressure control systems, we have illustrated our invention with reference to a power brake system for a wheeled vehicle having traction control features and anti-lock brake features, as indicated in FIG. 1.

A multiple position brake pedal, which is driver-operated, is indicated at 10. A brake position sensor, indicated schematically at 12, serves to indicate the initiation of braking.

A master brake cylinder 14 is situated in a pressure delivery circuit that includes a brake pressure fluid reservoir 16, which communicates with low pressure intake ports 18 and 20 of the master cylinder 14. A power brake actuator diaphragm assembly 22 responds to a pressure differential created by the engine intake manifold for an internal combustion engine in the vehicle driveline. In known fashion, the pressure generated at the pressure outlet passage 24 is a result of the driver-operated braking force on brake pedal 10, and augmentation of the braking force developed by the diaphragm assembly 22.

A pressure accumulator, schematically shown at 26, serves as a pressure source for the traction control system for the rear left brake 28 and the rear right brake 30. The accumulator is charged by a small motor 32, which drives a charging pump 34. If desired, the motor 32 can drive also a second pressure supply pump 36 for the front-left wheel brake 38 and the front-right wheel brake 40. Pumps 34 and 36 are supplied with fluid from the reservoir 16 through supply passages 42 and 44, respectively. Check valves 46 and 48 prevent backflow toward the pumps 34 and 36.

The master cylinder 14 delivers brake fluid pressure through passage 24 to solenoid actuated fill valve 50 and solenoid actuated dump valve 52 for the front left wheel brake 38. It also supplies fluid pressure to solenoid operated fill valve 54 for the front right wheel brake 40. The solenoid operated dump valve 56 for the wheel brake 40 communicates with low pressure vent passage 58, which leads to the reservoir 16. Dump valve 52 for the front left brake 38 also communicates with the reservoir through passage 58.

Wheel brake 28 has a fill valve 60, which communicates with the accumulator pressure passage 61, as does the fill valve 62 for the wheel brake 30. The solenoid operated dump valves 64 and 66 for the wheel brakes 28 and 30, respectively, also communicate with the reservoir through low pressure passage 68.

The accumulator is activated by a solenoid operated on/off valve 70, which is under the control of the processor.

Figure 6:
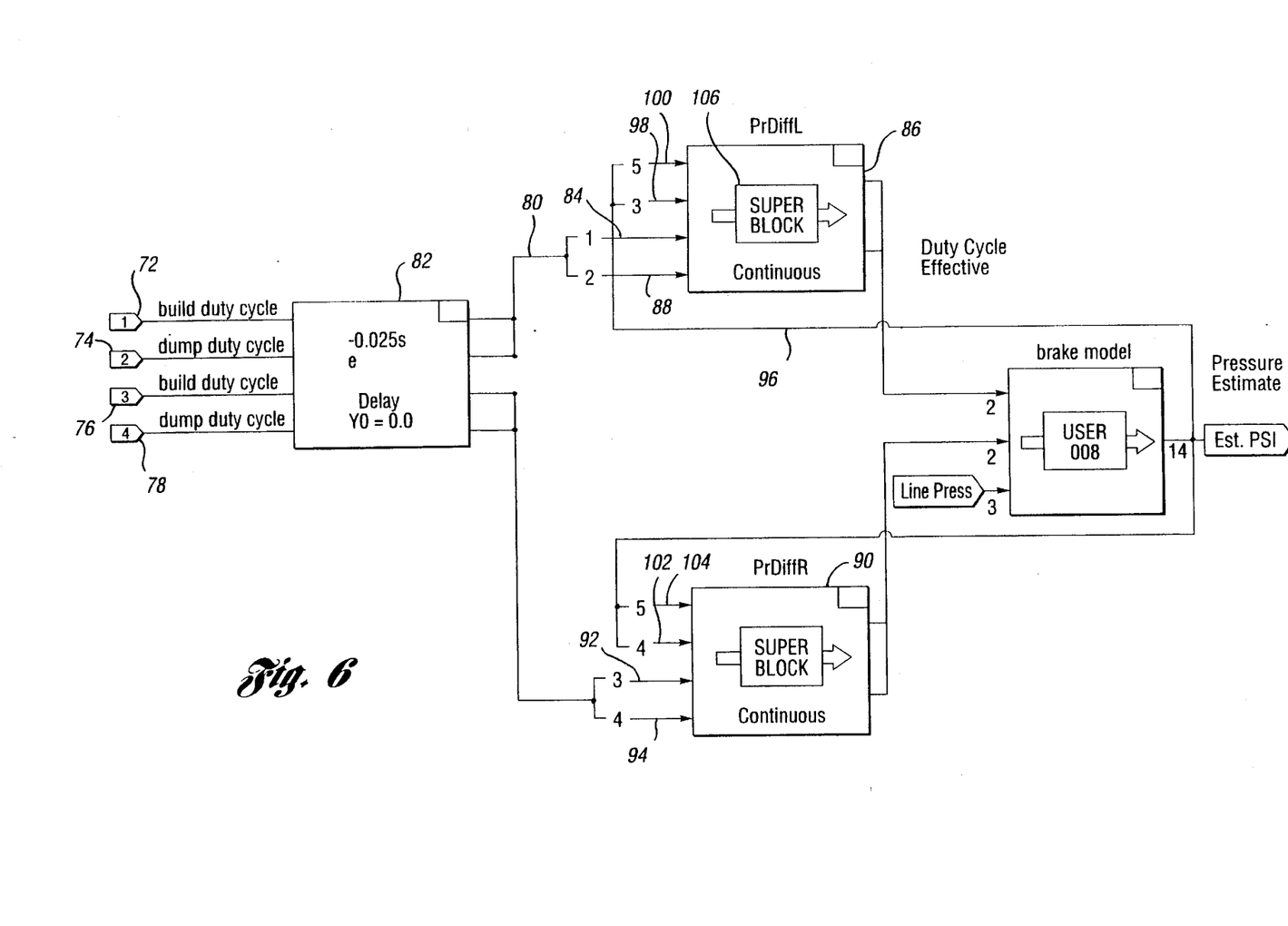
FIG. 6 shows a block diagram of a portion of the microprocessor identified as a continuous superblock, as distinct from a discrete superblock processing unit, for determining the effective duty cycle at the left and the right rear wheel brake actuators.

Referring next to FIG. 6, we have shown in block diagram form the control module of the processor that is devoted to the estimation of the pressure at the wheel brakes in response to commanded input duty cycle signals. The input ports for the processor are shown at 72, 74, 76 and 78. Numeral 72 represents the input of the build duty cycle for solenoid valve 50. Numeral 74 represents the dump duty cycle for the solenoid valve 52. Numeral 76 represents the build duty cycle for solenoid valve 54, and numeral 78 represents the duty cycle for the dump solenoid valve 56.

Typically, pulse width modulated valves of this kind function with a carrier frequency of between 30 and 100 Hz. In modeling such a system without relying upon our improved technique using effective duty cycle, very small integration steps would be required in order to obtain an expression of flow and pressure by an integration technique. In order to obtain a 1% duty cycle resolution, for example, a step size in the order of 200 microseconds would be required. That would be too time-consuming for practical, on-line, pressure estimation. We have overcome this difficulty in our improved control method, however, by relying instead on an effective duty cycle which is developed using the module indicated schematically in FIG. 6.

A processor at the input signal conditioning portion of the microcomputer will account for an inherent delay between the duty cycle commanded at input ports 72–78 and the response that is transferred to data flow path 80 in FIG. 6. Compensation is carried out for this inherent delay at location 82. In the example shown in FIG. 6, the delay is 0.025 seconds. That delay then is added to the effective input timing. The build duty cycle modified at 82 then is delivered to input location 84 for submodule 86. The input location for the modified dump valve duty cycle at 74 is indicated at 88. Corresponding modified duty cycles are delivered to submodule 90.

Submodule 90 is provided for the right wheel brake. This submodule receives the build duty cycle at 76 and the dump duty cycle at 78 for solenoid valves 54 and 56. After being modified by the delay constant at 82, the build duty cycle at 76 is transferred to input location 92 of the submodule 90 and the dump duty cycle at 78 is transferred to input location 94.

An estimated brake pressure will be developed, as will be explained subsequently, during each background control loop of the processor. The estimated brake pressure that is developed during a background control loop preceding the instant control loop is transferred through data flow path 96 to input point 98 for the submodule 86. The measured line pressure corresponding to the supply pressure is delivered to submodule 86 at input point 100. The corresponding input points for the submodule 90 are shown at 102 and 104, respectively.

Figure 8:
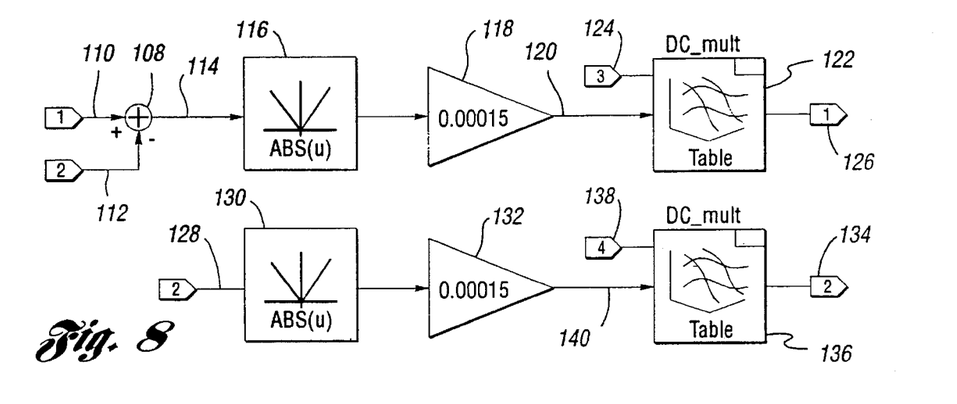
FIG. 8 is a block diagram of the portion of the system illustrated schematically in FIG. 6 for determining the effective duty cycle for the left and right vehicle wheel brake actuators.
Figure 9:
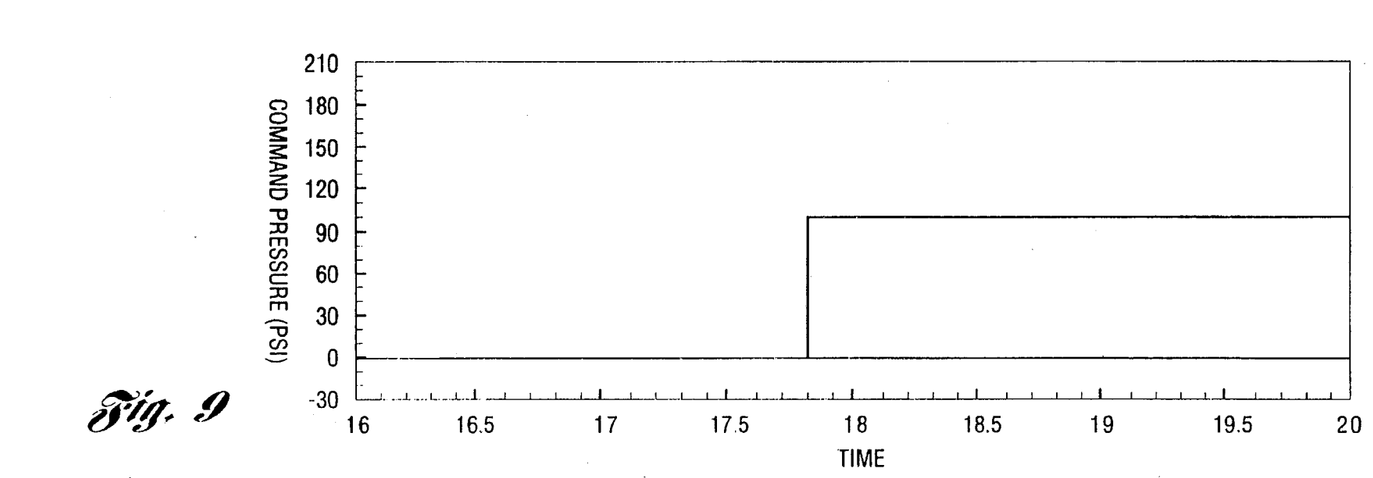
FIG. 9 is a plot showing the commanded pressure over time for the wheel brake system of FIG. 1.
Figure 10:
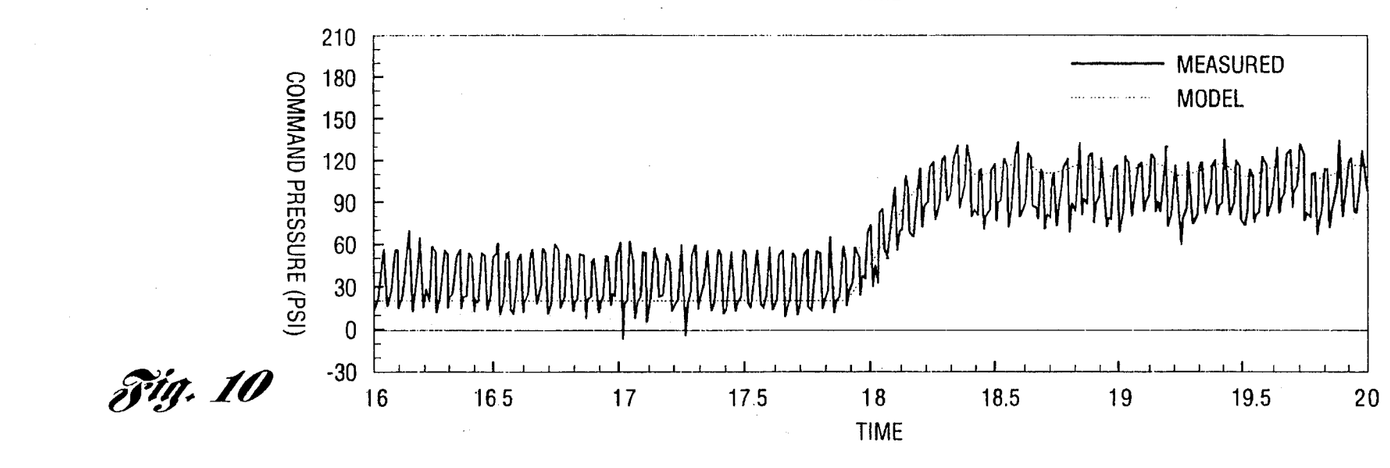
FIG. 10 shows the correlation between the actual brake pressure measured with a conventional pressure transducer and the estimated brake pressure obtained using our improved pressure estimation method.

Referring next to FIG. 8, we have shown in block diagram form the functioning of the submodule 86, particularly the superblock 106. The input to a comparator or summing point 108 in FIG. 8 is a line pressure at 110. A second input to the summing point 108 is an estimated brake pressure at location 112. Comparison of the values of the pressure at 110 and at 112 is made, and the differential pressure travels over data flow path 114. At function block 116, the absolute value of the differential pressure delivered to data flow path 114 is attained. That value, in turn, is subjected to a unit transfer at location 118 so that the differential pressure, measured in bars, can be expressed as the pressure differential in psi in function flow path 120. The unit transfer developed at 118 multiplies differential pressure in metric units (Pascal neurons/sq. meters) by the conversion factor shown to produce a pressure value expressed in English units (psi).

Using the differential pressure at 120, the processor will address the memory location 122, which has stored in it a table indicating the relationship between effective duty cycle and two variables; namely, differential pressure in function flow path 120 and a commanded duty cycle at input point 124. Using the input values for differential pressure and the commanded duty cycle, an instantaneous value for effective duty cycle is obtained and transferred to point 126.

A corresponding effective duty cycle for the dump valve 52, shown in FIG. 1, is obtained in a similar fashion. This involves transferring an estimated pressure obtained during the preceding background loop to location 128 in FIG. 8. This, in effect, is the equivalent of the differential pressure in data flow path 114 since the line pressure for the dump valve 52 is zero because it communicates with the reservoir. As in the case of the build valve, the absolute value of the pressure at location 128 is obtained at location 130 and is transferred in psi to location 132 after the conversion factor $1.5 \times 10^{-4}$ is applied.

A unit translation of the absolute value for the pressure is obtained by applying the same concept indicated at 118. As in the case of the build valve, an effective duty cycle is obtained for the dump valve and transferred to output location 134. The inputs for the memory location 136 are the table values for commanded duty cycle and differential pressure, shown at locations 138 and 140, respectively.

Figure 2:
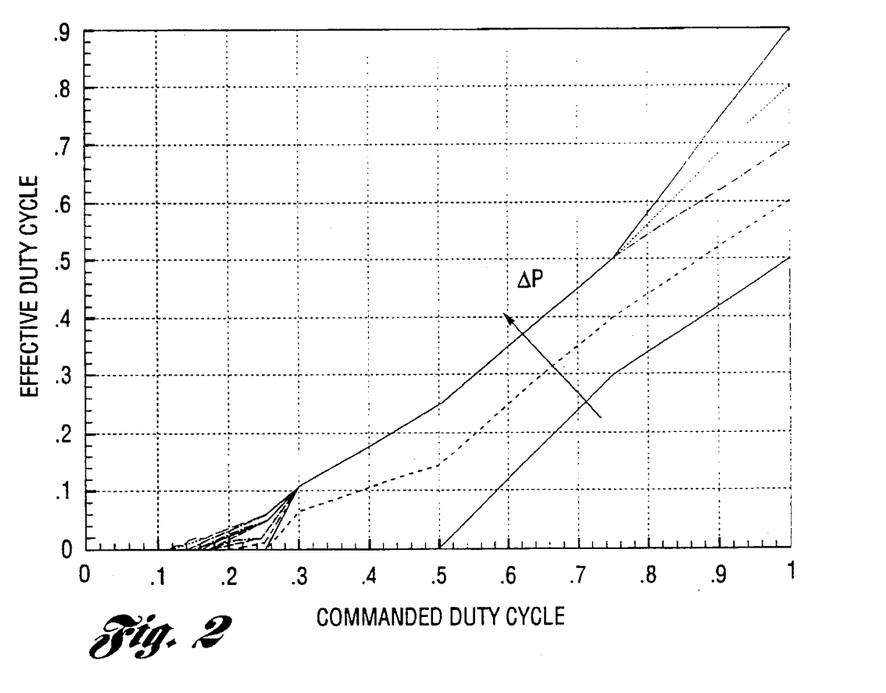
FIG. 2 is a chart showing the relationship between commanded duty cycle and effective duty cycle for the left front wheel brake build valve for various differential pressures at the build valve.
Figure 3:
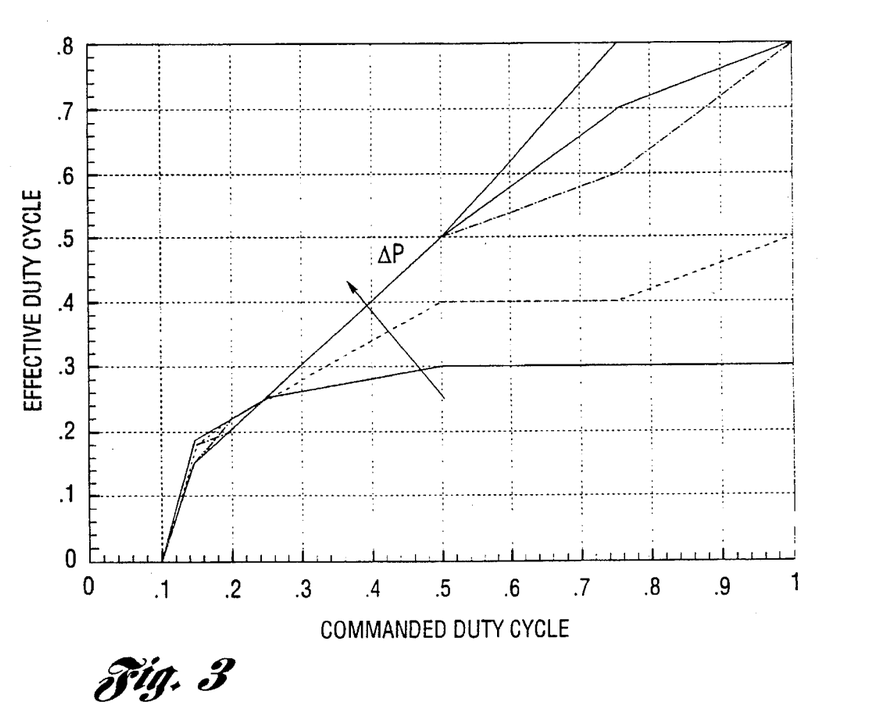
FIG. 3 is a view similar to FIG. 2 showing the relationship between commanded duty cycle and effective duty cycle for various differential pressures at the left front dump valve.
Figure 4:
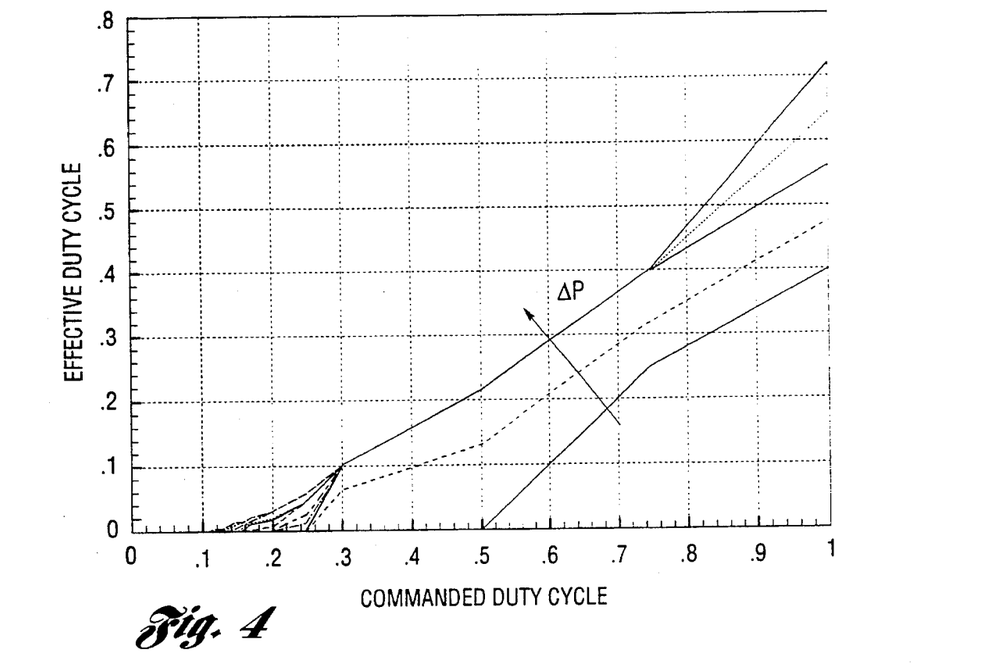
FIG. 4 is a view similar to FIG. 2 indicating the relationship between commanded duty cycle and effective duty cycle for various differential pressures for the right front build valve.
Figure 5:
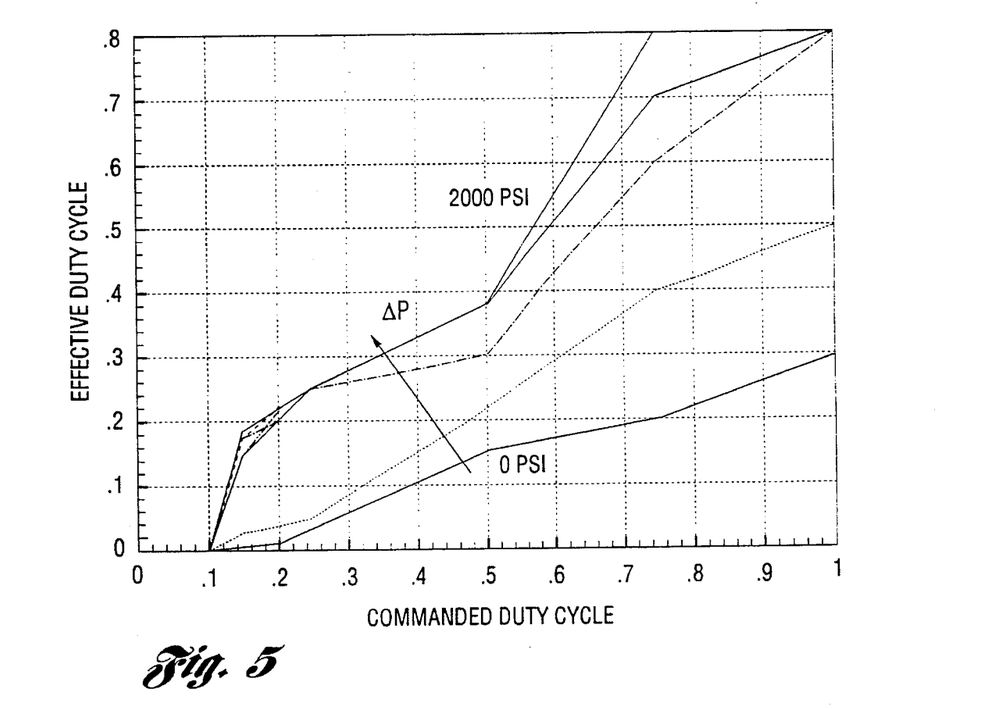
FIG. 5 is a view similar to FIG. 2 indicating the relationship between commanded duty cycle and effective duty cycle for various differential pressures for the right front dump valve.

FIGS. 2, 3, 4 and 5 show, respectively, the table data for obtaining effective duty cycle for the solenoid valves 50, 52, 54 and 56, respectively. FIG. 2 shows the commanded duty cycle plotted against the effective duty cycle for a family of differential pressures. This information is obtained through empirical tests and is recorded in superblock 106 of the submodule and in the corresponding superblocks of the other submodules for each of the other solenoid valves 52, 54 and 56.

Figure 7:
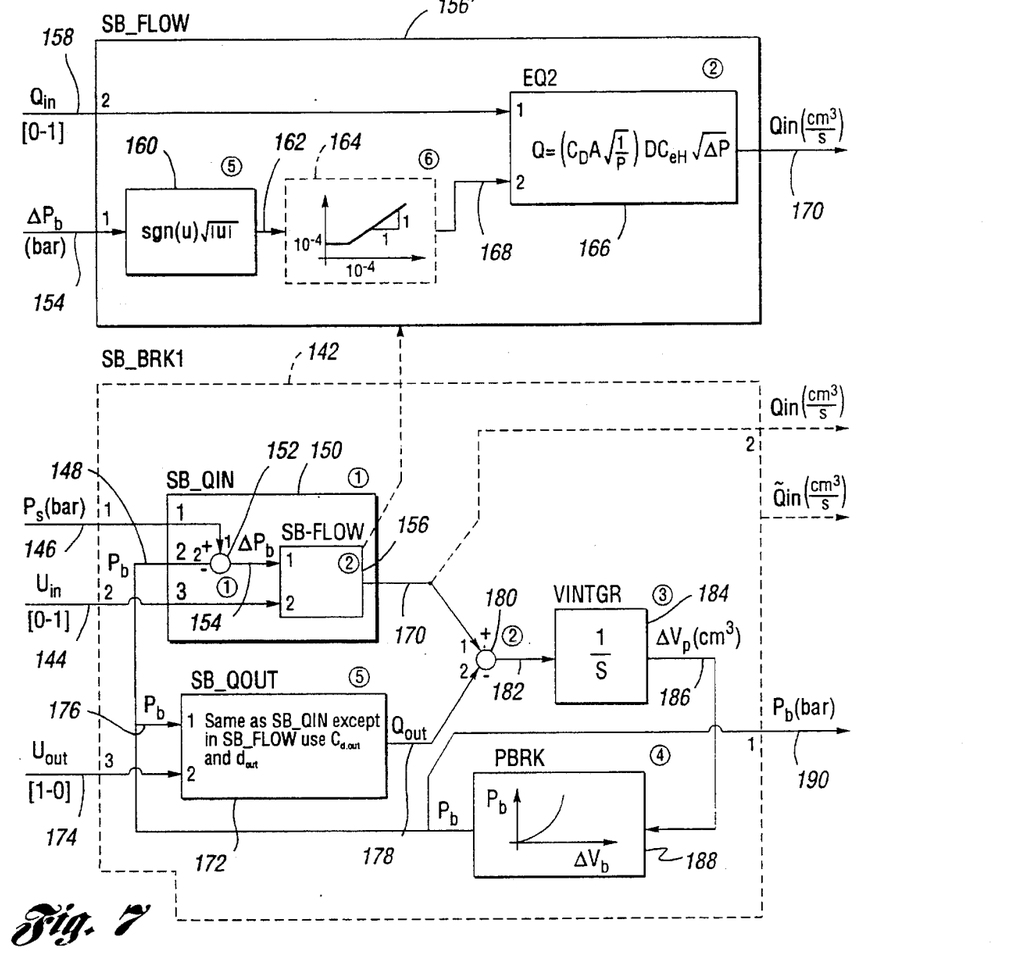
FIG. 7 is a block diagram of a brake model which forms a part of the block diagram of FIG. 6 and which uses the effective duty cycle calculated in the controller portions indicated in FIG. 6 to develop an estimated pressure at the wheel brakes during each background loop of the processor.

Referring next to FIG. 7, the portion of the processor used to process effective duty cycle information is obtained by superblock 142. The input location 144, shown in FIG. 7, receives the effective duty cycle information that was transferred to location 126 in FIG. 8. The line pressure is delivered to the superblock 142 at location 146. The estimated brake pressure, which is obtained during process steps to be described subsequently, is delivered to superblock 150 at location 148.

Superblock 150, which is a component of superblock 142, has a comparator 152 that receives the data at locations 148 and 146, compares their values and determines a differential pressure at location 154. The effective duty cycle at location 144, as well as the differential pressure at 154, is transferred to a sub-superblock 156, which is a part of the superblock 150.

Superblock 156 is shown in enlarged and more detailed form at 156' in FIG. 7. The effective duty cycle for build valve 50 is transferred to location 158, and the differential pressure indicated at 154 is transferred to location 160 for the superblock 156' where the sign is altered to produce an absolute value and where the controller will determine the square root of that absolute value. The result of that calculation is transferred through data flow path 162 to block 164 in order to speed up the simulation of the brake pressure for very small pressure differences across the valves. This is done by applying a multiplier to the differential pressure values in data flow path 162.

At block 166, the data representing the square root of the differential pressure at 154 is transferred to input point 168. The effective duty cycle for the build valve 50 is transferred to the block 166 through data flow path 158. A flow calculation takes place at block 166 as indicated by the equation shown in FIG. 7. In this equation, "Q" is the flow, the constant $C_d$ is the orifice coefficient, "A" is effective cross-sectional area, "$DC_{eff}$" is the effective duty cycle, and "$\Delta P$" is the differential pressure.

The value for the flow into the brake is indicated at location 170.

Block 172 receives an effective duty cycle for the dump valve at location 174. As in the case of the superblock 150, superblock 172 receives an estimated brake pressure from the preceding microprocessor background loop at location 176. The superblock 172 functions in a manner similar to the functioning of the superblock 150, as described previously. The output from the superblock 172 is flow out of brake valve 52, as indicated at 178.

At location 180, a comparison is made between the flow values at locations 170 and 178. The difference in the flow values is transferred through data flow path 182 to an integrator section 184, which develops a differential volume $\Delta V_b$ at location 186. That value is transferred through data flow path 186 to location 188. This location is a register in memory that contains data representing the relationship between the values for $\Delta V_b$ and estimated brake pressure data as indicated schematically by the plot shown in FIG. 7 at 188, where estimated brake pressure is indicated on the ordinate and the differential volume $\Delta V_b$ is indicated on the abscissa.

The output from the table look-up associated with location 188 is transferred to output location 190 as well as to input locations 148 and 176 for the blocks 150 and 172, respectively. The magnitude of the estimated brake pressure at location 190 is used as an input for the processor for determining a more precise duty cycle command for establishing the anti-lock brake function, the traction control function and related overall interactive vehicle dynamics control. Thus, the processor is capable of developing a useful control signal with reduced flow without the complicated and time-consuming integration steps that would be required if the strategy did not take advantage of a so-called effective duty cycle by relying upon sound physical principles and experimentally determined empirical control data.

It will be apparent to persons skilled in the art that our improved system can be applied to hydraulic control systems other than power brakes or traction control systems for automotive vehicles. We have described such a brake and traction control arrangement, however, for purposes of explaining one embodiment of the invention.

What we claim and desire to secure by U.S. Letters Patent is:

1. A method for estimating pressure in a hydraulic control system having fluid pressure-operated elements, each of said fluid pressure operated elements having a fluid pressure working chamber, a pressure fluid supply line and a pressure fluid return line communicating with said pressure working chamber, a solenoid operated pressure distributor valve means for each pressure working chamber for forming a controlled flow restriction in said pressure supply line communicating therewith, said method including the steps of;

commanding a solenoid duty cycle to establish a controlled flow restriction in the supply line and in the return line for each of said working pressure chambers;

detecting a pressure differential between supply pressure in each of said supply lines and pressure on the flow return side of said pressure distributor valve means;

determining an effective solenoid duty cycle for each solenoid operated distributor valve means using an empirical relationship between commanded duty cycle and effective duty cycle for various values of said differential pressure;

calculating differential flow into and out of said distributor valve means in accordance with a functional relationship between estimated pressure in at least one of said pressure-operated elements and said effective duty cycle; and determining effective brake pressure in accordance with an empirical relationship between said differential flow and said estimated pressure.

2. The method set forth in claim 1 wherein said pressure-operated element is a wheel brake for a vehicle wheel having a brake pressure cylinder, said pressure working chamber being defined in part by said cylinder.

3. The method as set forth in claim 2 wherein said control system includes a microprocessor with memory registers containing a table of values for effective duty cycle for various values of said differential pressure and commanded, actual duty cycle.

4. The method set forth in claim 1 wherein said control system includes a microprocessor with memory registers containing a table of values for effective duty cycle for various values of said differential pressure and commanded, actual duty cycle.

5. A method for estimating brake pressure in a hydraulic control system having fluid pressure-operated elements, each of said pressure-operated elements having a fluid pressure working chamber, a pressure supply line and a pressure fluid return line communicating with said pressure working chamber, a solenoid operated pressure build valve means in said supply line defining a controlled restriction in said pressure supply line, a solenoid operated pressure dump valve means in said pressure fluid return line communicating with said pressure working chamber for establishing a controlled flow restriction between said pressure working chambers and an exhaust region, said method including the steps of:

commanding a solenoid duty cycle for said pressure build valve means to establish a controlled flow restriction in the supply line for said working pressure chamber;

commanding a solenoid duty cycle for said dump valve means to establish a controlled flow restriction between the flow outlet side of said build valve means and said exhaust region;

detecting a pressure differential between supply pressure in said supply line and pressure on the flow outlet side of said build valve means;

detecting a pressure differential between brake pressure on the flow outlet side of said fill valve means and the flow outlet pressure in said exhaust region; and calculating flow into and out of said build valve means and said dump valve means in accordance with a functional relationship between integrated differential flows and said brake pressure.

6. The method set forth in claim 2 wherein said pressure-operated element is a wheel brake for a vehicle wheel having a brake pressure cylinder, said pressure working chambers being defined in part by said cylinder.

* * * * *